(12) United States Patent
Manna et al.

(10) Patent No.: US 7,207,445 B2
(45) Date of Patent: Apr. 24, 2007

(54) DEVICE AND METHOD FOR NON-DISPERSIVE CONTACTING OF LIQUID—LIQUID REACTIVE SYSTEM

(75) Inventors: Ujjwal Manna, Haryana (IN); Ram Prakash Verma, Haryana (IN); Sarvesh Kumar, Haryana (IN); Sukumar Banik, New Delhi (IN); Arpita Dasgupta, New Delhi (IN); Shankar Khatua, New Delhi (IN)

(73) Assignees: Engineers India Limited, New Delhi (IN); Indian Oil Corporation, Limited, Bandra (IN)

( * ) Notice: Subject to any disclaimer, the term of this patent is extended or adjusted under 35 U.S.C. 154(b) by 465 days.

(21) Appl. No.: 10/813,815

(22) Filed: Mar. 31, 2004

(65) Prior Publication Data

US 2006/0231490 A1     Oct. 19, 2006

(51) Int. Cl.
*B01D 11/00* (2006.01)
*B01D 11/04* (2006.01)
*B03D 3/00* (2006.01)

(52) U.S. Cl. .................... 210/511; 210/634; 210/757; 422/256; 208/203; 208/226; 208/230; 208/235

(58) Field of Classification Search ............... 210/511; 422/256
See application file for complete search history.

(56) References Cited

U.S. PATENT DOCUMENTS 3,992,156 A * 11/1976 Clonts ..................... 422/256
5,997,731 A * 12/1999 Suarez ..................... 208/230

* cited by examiner

*Primary Examiner*—Krishnan S. Menon
(74) *Attorney, Agent, or Firm*—Volpe and Koenig. P.C.

(57) ABSTRACT

An apparatus for separating impurities from a liquid by a non-dispersive contacting of a liquid—liquid reactive systems, the liquids being immiscible with each other, having a cylindrical column separated into a first stage and a second stage, a plurality of modules of packed metallic fibers mounted in the first stage of the column on a support, a first distributor provided in the first stage of the column for distributing a first liquid located above the support such that the first liquid completely wets the fibers by capillary action and forms a film thereon, a second distributor fitted at a bottom portion of the second stage for distributing a second liquid containing impurities on to the metallic fibers, wherein the second liquid flows concurrently with said first liquid so that the impurities present in the second liquid react with the first liquid and dissolve therein and a separator connected to a bottom of said column separates the first liquid and purified second liquid.

18 Claims, 6 Drawing Sheets

V1 CAUSTIC STORAGE TANK
V2 HC STORAGE TANK
R1 ROTAMETER FOR CAUSTIC
R2 ROTAMETER FOR HC
C1 CONTINUOUS FILM CONTACTOR
S1 LIQUID LIQUID SEPARATOR
D CAUSTIC DISTRIBUTOR
R1 & R2 ELECTRICAL HEATING TAPE

V1 CAUSTIC STORAGE TANK
V2 HC STORAGE TANK
R1 ROTAMETER FOR CAUSTIC
R2 ROTAMETER FOR HC
C1 CONTINUOUS FILM CONTACTOR
S1 LIQUID LIQUID SEPARATOR
D CAUSTIC DISTRIBUTOR
R1 & R2 ELECTRICAL HEATING TAPE

DEVICE AND METHOD FOR NON-DISPERSIVE CONTACTING OF LIQUID—LIQUID REACTIVE SYSTEM

FIELD OF THE INVENTION

The present invention relates to an improved method and device for non-dispersive contacting of liquid—liquid reactive system. In particular, the present invention relaxes to a process and an apparatus for separating impurities from a liquid by a non-dispersive contacting of liquid—liquid reactive systems, said liquids being immiscible with each other.

BACKGROUND OF THE INVENTION

There are many impurities/contaminants present in the downstream hydrocarbon products like LPG, gasoline, naphtha, kerosene, diesel etc, from petroleum crude processing units. These contaminants appear in hydrocarbon products due to natural sources or are produced during passage through different processing stages. The impurities like napthenic acid in diesel, hydrogen sulfide, mercaptans and COS in gasoline, LPG, naphtha and kerosene obtained from different units are required to be removed to meet the desired specifications which are becoming more and more stringent in order to meet the environmental statutory regulation.

These hydrocarbons are treated with either caustic or amine solution, or by both, in a contactor. As will be apparent to a person skilled in the art, a contactor should ensure proper contacting of immiscible liquid—liquid systems. Such contactors could be a packed column, tray column, mixing valve or static mixer depending on specific application. For example, for removing $H_2S$/mercaptan from a hydrocarbon stream, a mixing valve is used. In a mixing valve, one phase gets dispersed into the other phase as droplets, at the expense of shear energy. In this process, the ratio of hydrocarbon and caustic phase is important for maintaining efficiency of the process. Such process is effective when the reaction of the impurities with the second liquid is very fast, However, such processes suffer carryover of the dispersed phase along with the continuous phase. All these processes generate a certain degree of turbulence between the phases.

Contactors are also known in which minimum turbulence is generated in the contact zone, such contactors are made of fibre bundles (U.S. Pat. Nos. 3,754,377; 3,758,404; 3,839,487 and 5,904,849). In such contactors, a series of thin fibre strands are housed in a column. U.S. Pat. No. 3,758,404 describes one such arrangement and U.S. Pat. No. 3,992,156 describes an improved contactor.

For certain applications, for e.g. removal of napthenic acid from diesel, the above contactors other than fibre film contactors can not be used, as turbulence of phases creates an emulsion which is stabilized by the sodium naphthenic, which acts like a surfactant. Sodium naphthenate is formed during reaction of caustic with naphthenic acid. Conventional contactors, e.g. mixing valves, static mixers do not work due to emulsion formation. Even with fibre film contactors, using a conventional distribution system, emulsification could not be avoided. Therefore, there is an urgent need for developing a novel distribution system to ensure that turbulence in the interface of caustic and hydrocarbons is avoided.

Napthenic acids are the main contributors to acidity of the diesel. The napthenic acids react with caustic according to the following equation.

$$R\text{—}COOH + NaOH = R\text{—}COONa + H_2O$$

The sulfur compounds such as hydrogen sulfide and mercaptans react with caustic according to the equations as follows:

$$H_2S + NaOH = Na_2S + 2H_2O$$

$$RSH + NaOH = RSNa + 2H_2O$$

Depletion rate of impurities is controlled by mass transfer rate as reaction rate is very high.

The mass transfer rate of reacting species can be expressed as:

$$R = (k)(A \times AC) \text{ Where}$$

k mass transfer coefficient,
A Interfacial area,
AC concentration gradient

In conventional treating mechanisms, devices such as mixing valves and static mixers create an interfacial area by dispersive mixing, which generate droplets. To maximize the surface area for a given volume, considerable shear energy must be imparted to form as many small droplets as possible. Also droplet size has to be as small as possible. Small droplets, however, have the disadvantage of taking a longer time to separate from the bulk phase. Consequently, a large separator is provided.

The Continuous Film Contactor (CFC) is a static contacting device that produces non dispersive contacting of the caustic and hydrocarbon phases and improves the removal of acidic/sulphidic impurities from hydrocarbon streams. This prevents emulsion formation and results in minimum caustic carry over and high utilization of caustic solution.

The contactor, containing fibers, provides a large interfacial area, which increases the mass transfer rate. At the same time, the aqueous phase is constrained to the fibre material by surface tension forming a film on each fibre that contacts, but never mixes with the hydrocarbon phase. Consequently, separation of phases becomes a simple and efficient step in the process.

The efficiency of the mass transfer of undesirable contaminants from hydrocarbon phase to aqueous phase depends on the distribution of both of the liquid phases into the fibre packing. Also, packing of fibers and the fibre holding arrangement play an important role. Packing of fibers should be in such a way that it is equally and evenly distributed across the cross section and throughout the column length, so that caustic and hydrocarbon in any portion of the column should not pass without seeing each other. The interfacial area of mass transfer depends upon how the column is packed i.e., fibre diameter, number of fibers.

OBJECTS OF THE INVENTION

It is an object of the invention to a provide a distribution system for processing hydrocarbon containing naphthenic acid with caustic without forming an emulsion.

It is another object of the present invention to enhance the performance of the distribution system by optimizing operating parameters e.g. temperature, caustic concentration, etc.

It is yet another object of the present invention to improve performance of a contactor by ensuring complete wetting of fibers before the hydrocarbon phase is introduced It is still another object of the present invention to provide a process for removal of impurities where it requires less time for phase separation, less space, less energy and less operating cost and better product specification with respect to removal of contaminants/impurities.

It is still another object of the present invention to provide an apparatus for carrying out the process of the present invention.

It is still another object of the present invention to provide a novel distribution system to ensure that turbulence in the interface of caustic and hydrocarbons is avoided.

As a whole the overall object of the present invention is to develop a novel process and mass transfer equipment which can be used for removal of undesirable contaminants/impurities like, naphthenic acid, hydrogen sulphide and mercaptans, etc. present in product hydrocarbon streams like LPG, gasoline, naphtha, diesel, kerosene etc.

SUMMARY OF INVENTION

The present invention relates to a novel distribution system for hydrocarbon and caustic for a contact in a contactor containing fibers. The distribution system consists of two stages in the distributor. This system allows complete wetting of the fibre during the aqueous phase and before the hydrocarbon phase is introduced.

DETAILED DESCRIPTION OF THE PRESENT INVENTION

Figure 1:
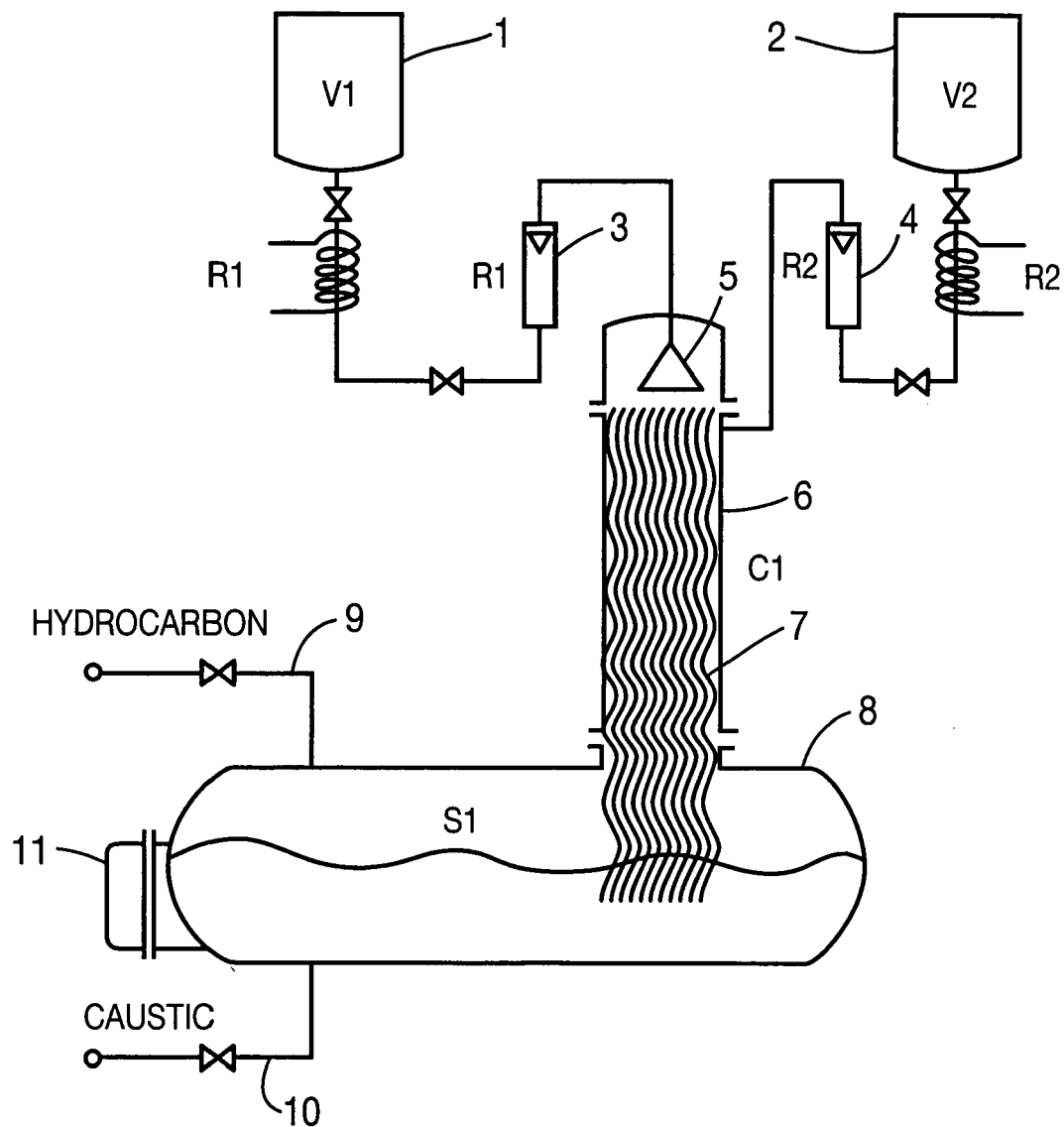
FIG. 1 represents the general assembly of a fibre film contactor with all accessories such as a distributor, fibre support, etc, fitted on a separator vessel with inlet and outlet provisions.

Accordingly, the present invention provides an apparatus for separating impurities from a liquid by non-dispersive contacting of liquid—liquid reactive systems, said liquids being immiscible with each other, which comprises a cylindrical column separated into a first stage and a second stage, a plurality of modules of packed metallic fibers mounted in the first stage of said column on a support, a first distributor provided in the first stage of the column for distributing a first liquid located above said support such that said first liquid completely wets said fibers by capillary action and forms a film thereon, a second distributor fitted at a bottom portion of the second stage for distributing a second liquid containing impurities on to the metallic fibers, wherein said second liquid flows concurrently with said first liquid so that the impurities present in said second liquid react with said first liquid and dissolve therein, and a separator connected to a bottom of said column separates the first liquid and purified second liquid.

In an embodiment of the present invention, the first distributor separates the cylindrical column into a first stage and a second stage in addition to distributing the first liquid.

In another embodiment of the present invention, the packed metallic fibers are comprised of fine wires packed in a single or multiple tubes in order to enable mass transfer and/or mass transfer with chemical reaction to take place.

In yet another embodiment of the present invention, said modules are comprised of a plurality of tubes held inside a metallic shell, said shell being supported either on said separator or independently outside said separator.

In still another embodiment of the present invention, the modules are supported in said column at their upper ends.

In one more embodiment of the present invention, the modules are suspended from tie rods mounted in said first stage of said column and the metallic fibers are supported and looped around said tie rods.

In another embodiment of the present invention, the metallic wires are packed in the shape of a sinusoidal wave so that inter fiber void space is uniformly maintained.

In a further embodiment of the present invention, the metallic fibers are chemically treated to enhance wettability.

In another embodiment of the present invention, the metallic fibers are made of materials selected from stainless steel, phosphorous bronze, glass fibers and plastic materials.

In yet another embodiment of the present invention, the metallic fibers have a thickness in the range of from 0.1 mm to 0.3 mm.

In still another embodiment of the present invention, the modules of metallic fibers are comprised of multiple tubes with a cap on top of each tube, said cap being provided with an orifice designed for specific flow range.

In one more embodiment of the present invention, the first distributor is provided with a plurality of holes whose diameter is equal to or greater than the diameter of the packed metallic fibers.

In another embodiment of the present invention, the second distributor is provided with a plurality of holes whose diameter is equal to or greater than the diameter of the packed metallic fibers and a plurality of holes of smaller diameter which are placed adjacent to the holes whose diameter is equal to or greater than the diameter of the packed metallic fibers.

In a further embodiment of the present invention, the separator provided at the bottom of the column is optionally provided with heating coils.

The present invention also provides a process for separating impurities from a liquid by a non-dispersive contacting of liquid—liquid reactive systems which comprises distributing a first liquid over a support consisting of packed metallic fibers mounted in the first stage of a two stage liquid distributor so that the entire support is completely wetted by said first liquid by capillary action, said first liquid forming a film over said support, distributing separately, a second liquid containing impurities to be removed, said second liquid being immiscible with said first liquid and flowing concurrently with said first liquid so that the dissolved impurities in said second liquid react with the film forming first liquid and dissolve therein, the two liquids to flowing downward to a separator and collecting the pure second liquid and, if desired, recycling said first liquid.

In an embodiment of the present invention, the first liquid is selected from a caustic solution or amine solution or both and said second solution is a hydrocarbon stream.

In another embodiment of the present invention, the hydrocarbon stream is selected from LPG, gasoline, naphtha, kerosene and diesel.

In yet another embodiment of the present invention, the impurities present in the second liquid are naphthenic acid, hydrogen sulfide, mercaptans and COS.

The present invention also relates to holding of fibers in the distributor in a novel way as modules and each module is separately irrigated with caustic. The apparatus for holding fibers is an integral part of the distributor.

The present invention also relates to optimization of process parameters for enhancing performance of distribution system and removal of naphthenic acid from hydrocarbon phase without formation of emulsion.

As a whole, the present invention relates to the development of special nondispersive type mass transfer equipment and its internal components, wherein efficiency of the process depends on the efficiency of the equipment.

A new and improved equipment is provided for effective contact between two immiscible liquids to obtain efficient mass transfer with reaction. The increased surface area in CFC compared to conventional contacting devices, including mixing valves, improves the mass transfer rates between the two phases.

Thus, the present invention discloses an apparatus called Continuous Film Contactor (CFC) and a method for efficient contacting of immiscible liquid—liquid reactive system. The apparatus, consisting of a novel, two stage liquid distributor, ensures a smooth continuous film of liquid over a support consisting of stainless steel (SS) fibres arranged in a way such that capillary action of wetting liquid is ensured. A second liquid, distributed separately, flows concurrently and the dissolved component from this stream reacts with the film forming liquid and dissolves.

Alternatively, dissolved impurities from the aqueous phase may be extracted by the hydrocarbon phase. The distribution system allows minimum drag of the flowing liquid over film liquid and no turbulence is generated, which may cause emulsification in certain processes. Disclosed is a process for enhancing performance of a distribution and contactor system.

A Continuous Film Contactor (CFC) is a static contacting device in which mass transfer occurs in a concurrent flow of liquid—liquid system through a column tightly packed with fine proprietary metallic fibres. It has wide applications in the petroleum refinery field for treatment and purification of the products obtained from the main stream and also in other fluid handling industries. It provides the flexibility to meet both today's and tomorrow's environmental regulations regarding sulphur and other contaminants.

The present invention relates to proprietary design of aqueous and hydrocarbon phase distributors (2-Stage), a fibre holding arrangement, and as a whole design of a complete system for removal of hydrogen sulphide, mercaptan and other contaminants, such as sulphur compounds from LPG and similar hydrocarbon streams and neutralization of naphthenic acid in diesel and thiophenol from light cycle oil using aqueous caustic solution. The application is not limited to caustic-hydrocarbon contacting. The invention could be used for any liquid—liquid system such as a hydrocarbon-amine solution of water.

Accordingly, the present invention provides a process for separating impurities from a liquid by a non-dispersive contacting of liquid—liquid reactive systems which comprises distributing a first liquid over a support consisting of packed metallic fibres mounted in the first stage of a two stage liquid distributor so that the entire support is completely wetted by said first liquid by capillary action, said first liquid forming a film over said support, distributing separately, a second liquid containing the impurities to be removed, said second liquid being immiscible with said first liquid and flowing concurrently with said first liquid so that the dissolved impurities in said second liquid react with the film forming first liquid and dissolve therein, the two liquids flowing downward to a separator and collecting the pure second liquid and if desired, recycling said first liquid.

The present invention also provides apparatus for separating impurities from a liquid by a non-dispersive contacting of liquid—liquid reactive systems, said liquids being immiscible with each other, which comprises a cylindrical column, a plurality of modules consisting of packed metallic fibres mounted in the first stage of said column on a support, a first distributor for distributing a first liquid located above said support so that said first fluid completely wets said fibres by capillary action and forms a film thereon, a second distributor for distributing said second liquid containing said impurities fitted at the bottom of said support, said second liquid flowing concurrently with said first liquid so that the impurities present in said second liquid react with said first liquid and dissolve therein, and a separator, connected to the bottom of said column for separating the first liquid and said purified second liquid.

The related art of FIG. 1 comprises contactor C1, wherein (6) a vertical glass contactor consisting of treated stainless steal (SS) fibers (7). Caustic and diesel are introduced into the contactor (6). Caustic is introduced through a distributor (5). Diesel from tank V2 is a continuous phase and is introduced into the side of contactor (6). Caustic flows preferentially around SS fibers (7). The contactor (6) is located on top of a glass separator S1 in which the caustic and hydrocarbon phase separate.

In the present distribution system it was observed that emulsion is formed at the point where caustic and diesel meet. The emulsion formation continues up to the separator (8) and does not separate at all. This creates carry over of diesel in caustic and caustic in diesel. The reason for emulsion formation is basically generation of turbulence at the interface. Hydrocarbon phase comes out from the top of the separator (8) through hydrocarbon line (9) and contaminated caustic is taken out from the bottom of the separator (8) through line (10). An electrical heating arrangement (11) is provided in the separator (8).

Figure 2:
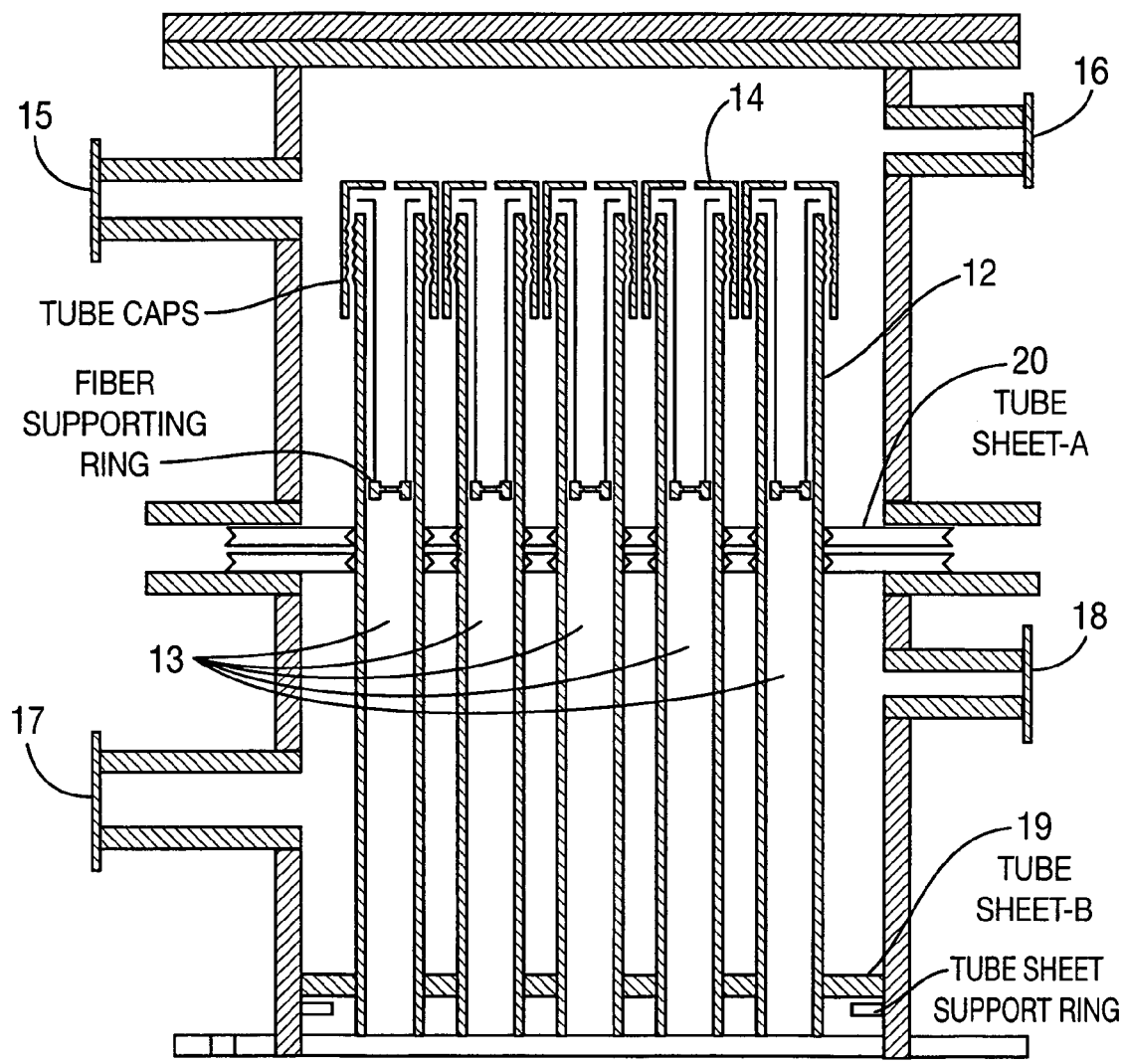
FIG. 2 depicts the general assembly of liquid distributors for aqueous and organic phase (2-stage distributor), fibre support.
Figure 3A:
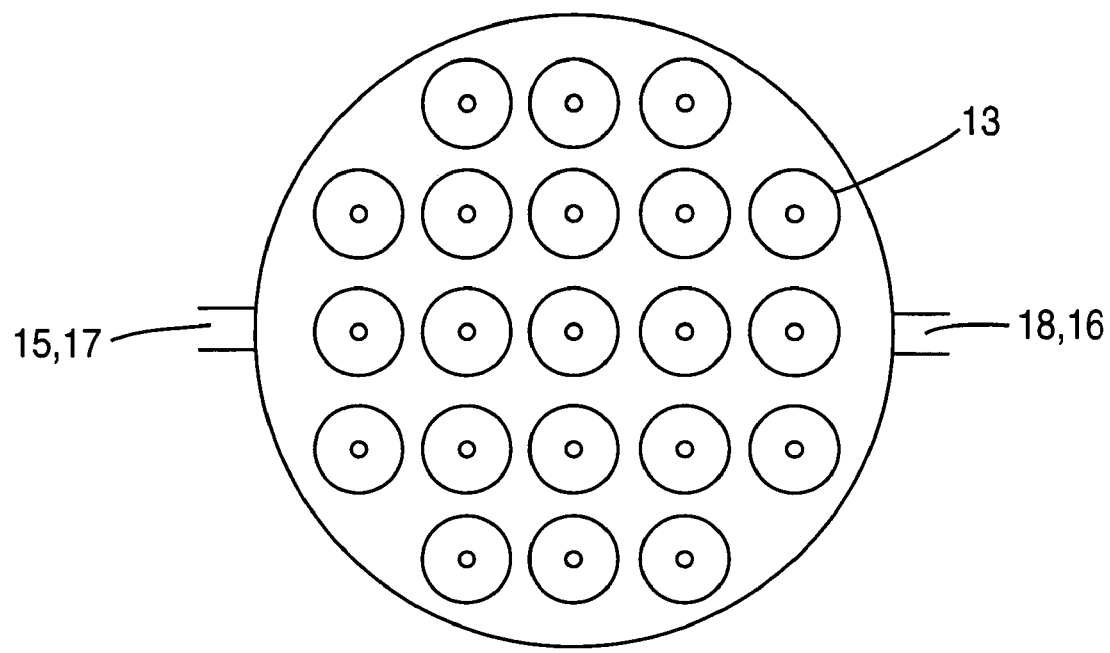
FIG. 3A describes the details of the first stage distributor and tube sheets.
Figure 3B:
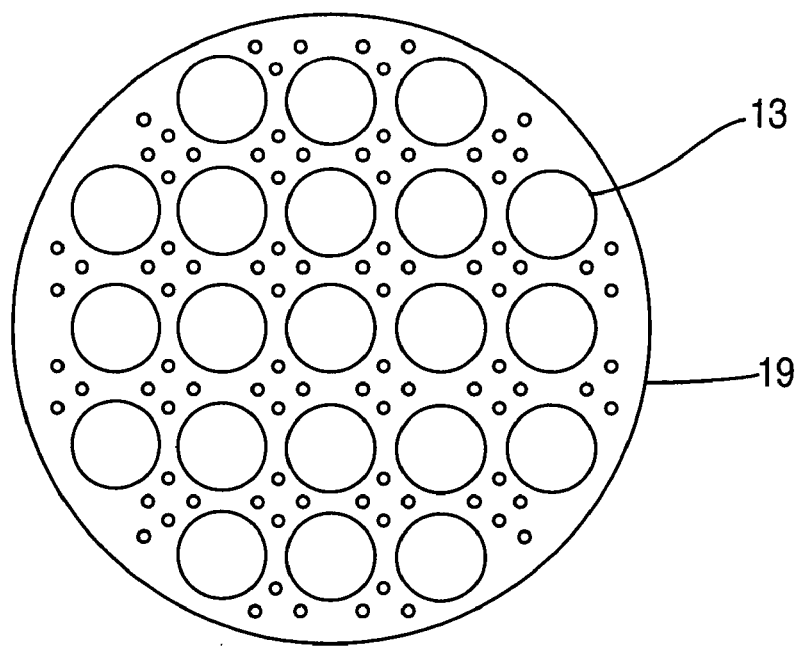
FIG. 3B describes the details of the second, stage distributor and tube sheets.
Figure 4:
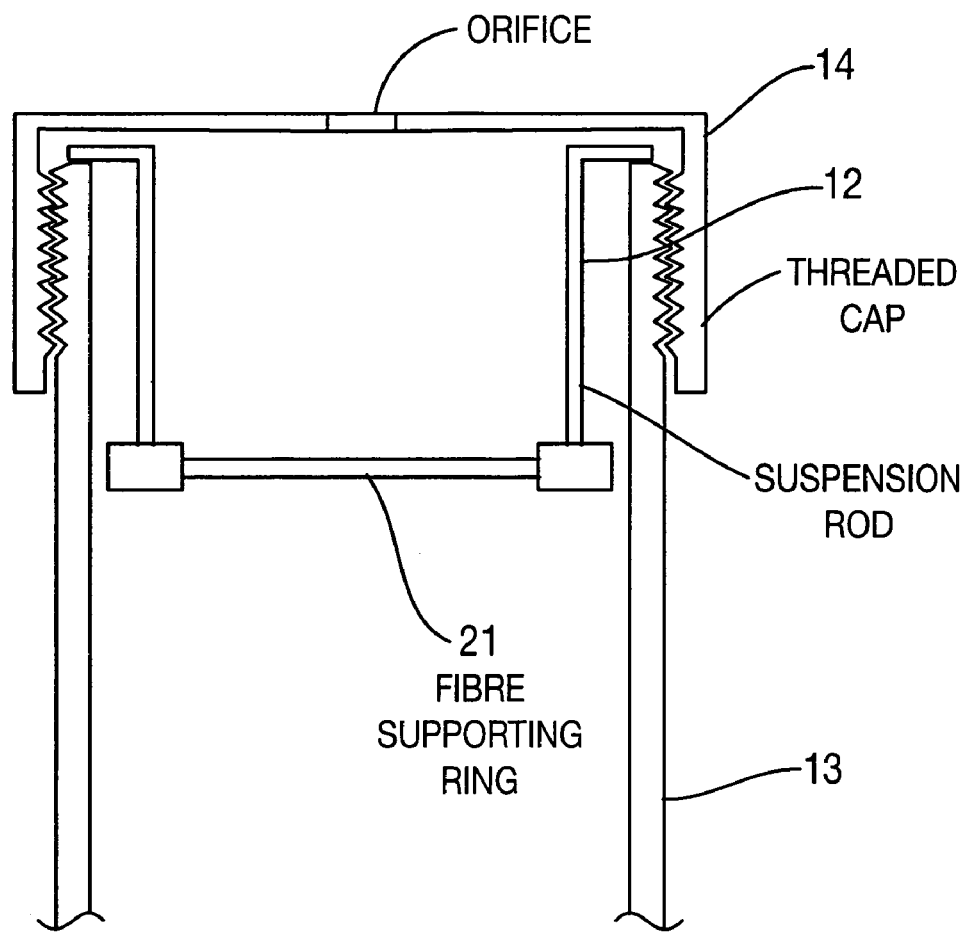
FIG. 4 depicts the details of fibre support/holder, rings, rods for fibre tie up.
Figure 4:
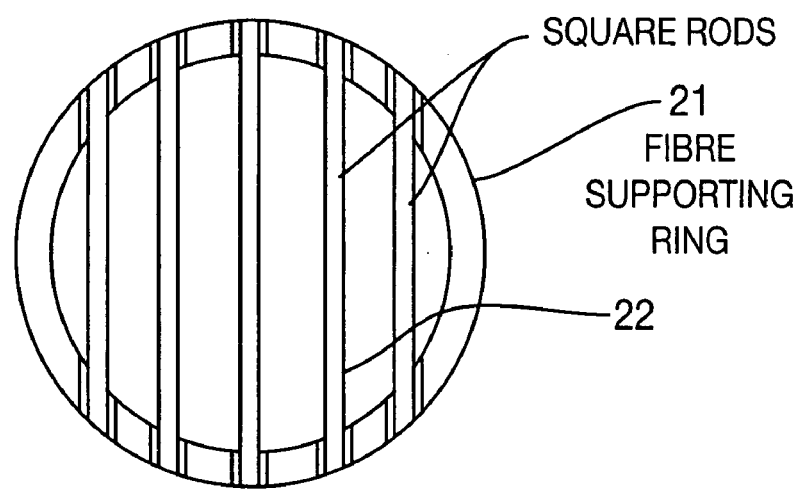

Subsequently, a novel distributor system consisting of two stages as shown in FIG. 2 was developed. The distributor comprises of fibers held together as modules (13). Each module (13) is separately irrigated with caustic. Aqueous caustic solution enters through nozzle (15) and is distributed in the caustic distributor (14). Fibers (7) are supported from tie rods (22) and tie rods are fixed on the ring (21), as shown in FIG. 4. Sufficient height is provided in each module to allow complete wetting of the fibers with caustic. Details of the caustic distributor are shown in the top view of FIG. 3 A. This is followed by distribution of diesel in the second distributor (19) located below caustic distributor (12). Diesel is fed so as to be distributed uniformly such that no turbulence occurs. Since the fibers are already wetted with caustic, drag force created by diesel flow can not dislodge caustic from the fibers. At least two vent nozzles (16, 18) are provided at two zones of the distributor. Each module (13) of fibers passes through tube sheet-A (20).

In the novel distribution system of the present invention, no emulsion formation was observed in any part of the contactor and separator, The process was further optimized by manipulating the temperature of caustic and diesel, and the flow ratio of diesel and caustic.

The system of the present invention was used to evaluate the performance of the equipment. Different type of diesel of TAN value varying from 0.5 to 0.7 mg KOH/gm of diesel (acidity due to naphthenic acid content) have been tested for naphthenic acid removal, product is obtained with TAN value of 0.025 to 0.087 mg KOH/gm of diesel. It was well below the maximum limit of 0.15 mg KOH/gm diesel of TAN value.

Figure 5:
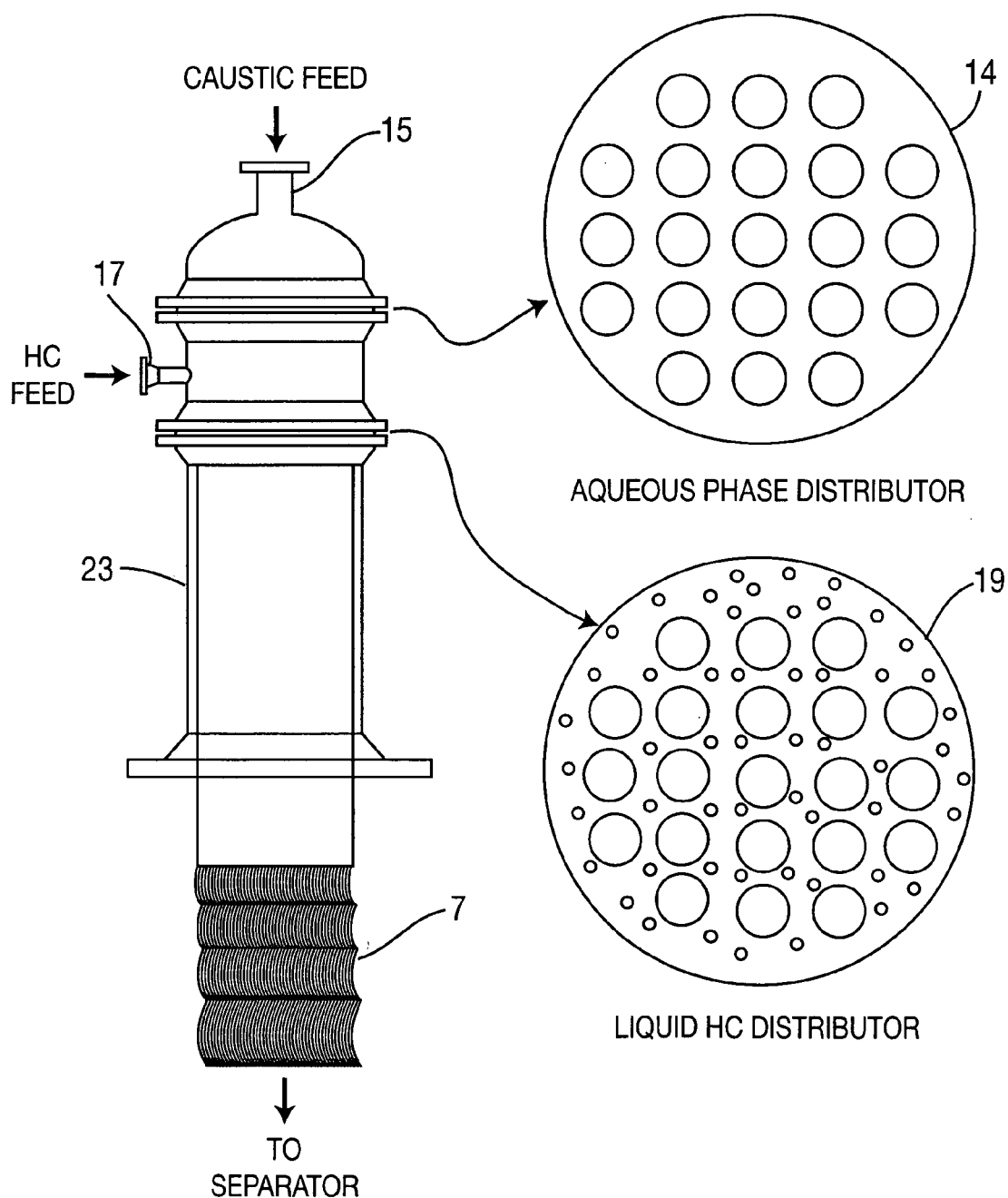
FIG. 5 represents the overall assembly of the column, sleeve, distributors and fibre holder.
Figure 6:
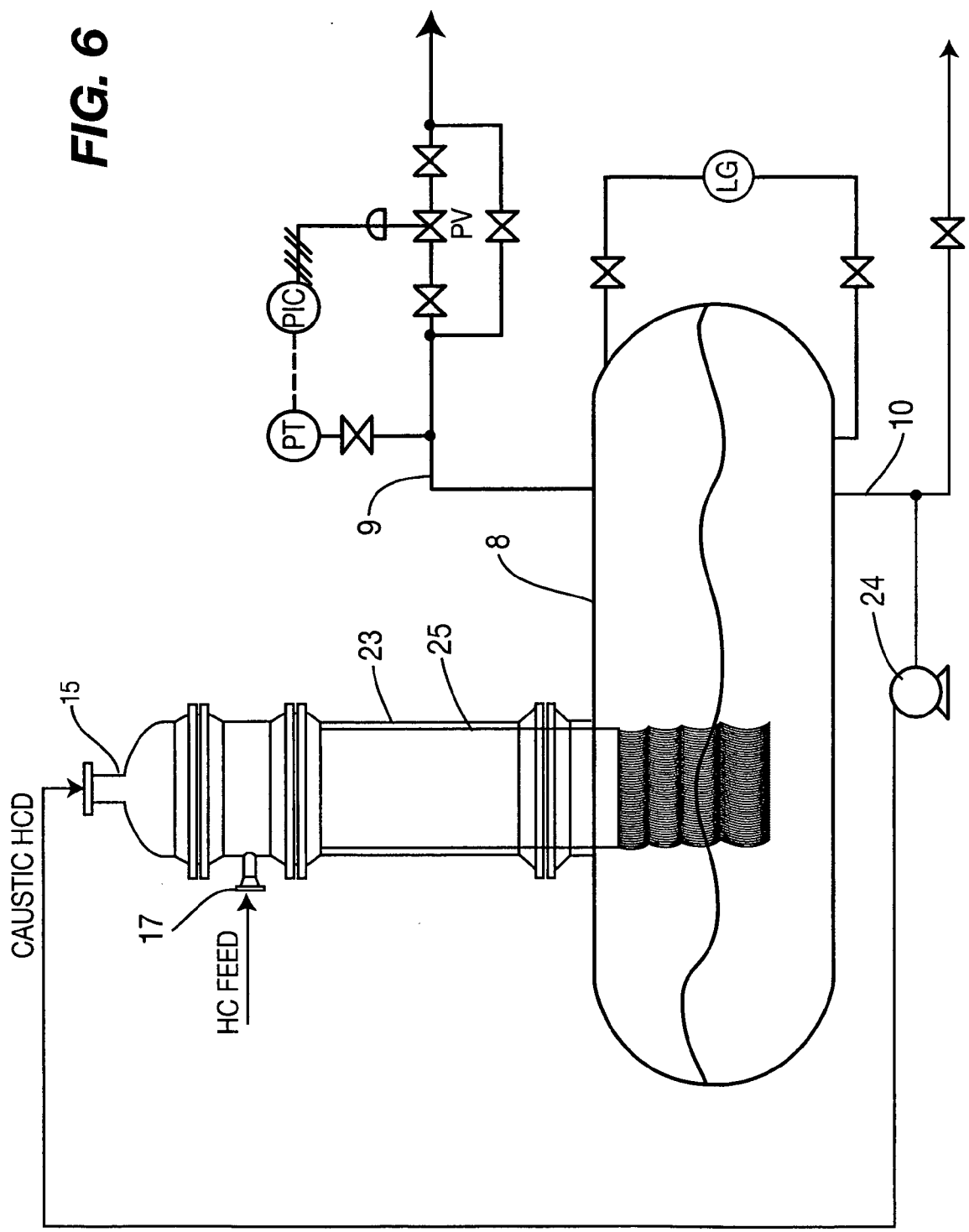
FIG. 6 depicts the overall arrangement of contactor and separator used in a commercial plant.

New and improved equipment/internals are tested for effective contact between two immiscible liquids to obtain efficient mass transfer with reaction. The increased surface area in the CFC compared to conventional contacting devices, including mixing valves, improves the mass transfer rates between the two phases. The continuous film contactor is a cylindrical column (23, 25) in which metallic fibers (7) are hung on a support (12), and extend to the inside of the separator (8) at the bottom of the contactor (23, 25) (FIGS. 5, 6). The aqueous phase distributor (14) is fitted at the top of the fibre holder/support (12) and hydrocarbon phase distributor (19) is fitted at the bottom of the fibre support (FIG. 2). Initially, metallic fibers are wetted by passing aqueous caustic solution through distributor (14) from the top of the fibers, then the hydrocarbon phase is fed separately through the other distributor. The two phases flow down concurrently through the contactor (25, 7) as thin films, the reaction occurring at the surface. The mass transfer of the reactants from the bulk phase to the interface and the transfer of the products from the interface to the bulk phase are enhanced due to thinness of the films. Both phases flow down to the separator (8), and they are separated there. The bottom aqueous phase is re-circulated by pump (24) and fed to the first stage caustic distributor (14) through nozzle (15).

The present invention will now be described with reference to the following non-limiting example.

EXAMPLE 1

The naphthenic acid content of NG diesel (140–390° C.) is much higher (0.6 mg KOH/gm or 0.256 wt %) than the recommended limit (0.15 mg KOH/gm or 0.05 wt %). The described embodiment is used in the general assembly (FIG. 1) for this experimentation. Caustic solution is fed from the top of the contactor through the distributor (FIGS. 2, 3A) (14) and NG diesel is fed through hydrocarbon feed nozzle (17) and distributed through hydrocarbon distributor (FIGS. 2,3B) (19). A thin layer is formed on the fibre (7) surface with aqueous caustic solution and diesel concurrently passing downwards along the film concurrently. Purified diesel is withdrawn from the top phase of the separator (8). The TAN value of diesel was obtained as 0.022 to 0.087 mg KOH/gm or 0.286 wt % TAN value.

Different operating parameters were used for the process. These are as follows:

| | |
|---|---|
| Optimum caustic concentration | 0.5–3% |
| Caustic: Diesel flow ratio | 1:10–1:20 |
| Operating temperature | 40 to 46° C. |
| Distributor | 2 Stage |
| Residence time in separator | 10–30 mins. |
| Type of fibre | Stainless Steel |
| Treatment | Chemical |
| Shape | Sinusoidal |

The experiment was repeated with a bigger size contactor in which re-circulation of caustic was maintained.

The caustic solution is pumped and filled in the separator (8). The caustic solution is then recycled from separator (8) and distributed over the top of the continuous film contactor (CFC) through the caustic distributor 14 FIGS. 2 and 3A. The hydrocarbon is pumped and distributed through hydrocarbon distributor 19 (FIG. 3B), where fibre bundles (13) are supported from the top and hung inside the sleeve (25) and extend into the separator (8). The caustic solution wets the fibres (7) preferentially and flows downwards to the bottom of the separator (8), The hydrocarbon also flows downward forming a layer around the caustic wetted fibres. The naphthenic acid present in the hydrocarbon dissolves in the caustic phase around the fibres (7) in the contactor (25).

The treated hydrocarbon and caustic solution are separated in the separator (8). The caustic solution from separator (8) is recycled back to the contactor until the depletion of concentration of caustic solution below 2 wt %. Purified hydrocarbon is withdrawn from the top phase in the separator (8).

The invention claimed is:

1. An apparatus for separating impurities from a liquid by a non-dispersive contacting of a liquid—liquid reactive system, said liquids being immiscible with each other, which comprises:
   a cylindrical column separated into a first stage and a second stage, a plurality of modules of packed metallic fibers mounted in the first stage of said column on a support, each of said modules having said metallic fibers mounted within a tube in said first stage, said tube having a bottom end and a top end, a cap on said top end, the caps provided with orifices designed for a specific flow rate,
   a first distributor provided in the first stage of the column for distributing a first liquid located above said support such that said first liquid completely wets said fibers by capillary action and forms a film thereon, said first distributor comprising a plurality of said tubes, each tube having a diameter greater than the holes in said cap, a second distributor fitted at a bottom portion of the second stage for distributing a second liquid containing impurities on to the metallic fibers, said second distributor having a first plurality of holes each of a diameter greater than the diameter of said tubes, and a second plurality of holes being smaller than said first plurality of holes and adjacent the holes of the first plurality of holes and each of said tubes extending between said first and second distributors, the top end being adjacent the first distributor and a bottom end protruding through said first plurality of holes in the second distributor, wherein said second liquid flows concurrently with said first liquid so that the impurities present in said second liquid react with said first liquid and dissolve therein; and
   a separator connected to a bottom end of said column for receiving said fibers and separating the first liquid and purified second liquid.

2. An apparatus as claimed in claim 1, wherein the first distributor separates the cylindrical column into a first stage and a second stage in addition to distributing the first liquid.

3. An apparatus as claimed in claim 1, wherein said packed metallic fibers are comprised of fine wires packed in at least one tube in order to enable at least one of a mass transfer and mass transfer with chemical reaction to take place.

4. An apparatus as claimed in claim 1, wherein said modules are comprised of said plurality of tubes held inside a metallic shell, said shell being supported by one of said separator and independently of said separator.

5. An apparatus as claimed in claim 1, wherein the modules are supported in said column at their upper ends.

6. An apparatus as claimed in claim 1, wherein the modules are suspended from tie rods mounted in said first stage of said column and the metallic fibers are supported and looped around said tie rods.

7. An apparatus as claimed in claim 1, wherein the packed metallic wires have a sinusoidal wave form so that an inter fiber void space is uniformly maintained.

8. An apparatus as claimed in claim 1, wherein the metallic fibers are chemically treated to enhance wettability.

9. An apparatus as claimed in claim 1, wherein the metallic fibers are made of materials selected from stainless steel, phosphorous bronze, glass fibers and plastic materials.

10. An apparatus as claimed in claim 1, wherein the metallic fibers are of a thickness of from 0.1 mm to 0.3 mm.

11. An apparatus as claimed in claim 1, wherein the first distributor is provided with a plurality of holes having a diameter is at least equal to a diameter of the packed metallic fibers.

12. An apparatus as claimed in claim 1, wherein the separator provided at the bottom of the column is provided with at least one heating coil.

13. A process for separating impurities from a liquid by non-dispersive contacting of liquid—liquid reactive systems which comprises:

distributing a first liquid over a first distributor stage having a support with at least one tube of packed metallic fibers mounted in the first distributor stage of a two stage distributor, the tube having bottom and top ends and a cap on the top end with an opening designed for a specific flow range of the first liquid and arranged so that the support is completely wetted by said first liquid by capillary action, said first liquid forming a film over said support, distributing separately by a second distributor stage of the two stage distributor, said second stage distributor having larger holes larger than the diameter of said tube and smaller holes adjacent to the larger holes, extending the tube between the first and second distributor stages with the tube protruding through the larger holes of the second distributor, a second liquid containing impurities to be removed, said second liquid being immiscible with said first liquid and flowing concurrently with said first liquid so that dissolved impurities in said second liquid react with the film formed by said first liquid and dissolves therein, providing a separator whereby the first and second liquids flow along the fibers and downward to the separator, and collecting the pure second liquid from the separator.

14. A process as claimed in claim 13, wherein the first liquid is selected from a group consisting of at least one of a caustic solution or amine solution of and both and said second solution is a hydrocarbon stream.

15. A process as claimed in claim 14, wherein the hydrocarbon stream is selected from a group consisting of LPG, gasoline, naphtha, kerosene and diesel.

16. A process as claimed in claim 13, wherein the impurities present in the second liquid are naphthenic acid, hydrogen sulfide, mercaptans and COS.

17. A process as claimed in claim 13 further comprising recycling the first liquid.

18. An apparatus as in claim 1 wherein said metallic fibers extend substantially into said separator.

* * * * *